US010213793B2

(12) United States Patent
Maclean et al.

(10) Patent No.: US 10,213,793 B2
(45) Date of Patent: Feb. 26, 2019

(54) CYCLONIC SEPARATION APPARATUS

(71) Applicant: Dyson Technology Limited, Wiltshire (GB)

(72) Inventors: Tim John Maclean, Bath (GB); Richard Allix Braine, Bristol (GB); Joshua James Tunstill, Bristol (GB); Ashley Jane Caddle, Swindon (GB)

(73) Assignee: Dyson Technology Limited, Malmesbury, Wiltshire (GB)

( * ) Notice: Subject to any disclaimer, the term of this patent is extended or adjusted under 35 U.S.C. 154(b) by 108 days.

(21) Appl. No.: 15/410,407

(22) Filed: Jan. 19, 2017

(65) Prior Publication Data
US 2017/0209875 A1 Jul. 27, 2017

(30) Foreign Application Priority Data

Jan. 22, 2016 (GB) .................................. 1601224.7

(51) Int. Cl.
*A47L 9/16* (2006.01)
*B04C 5/02* (2006.01)
(Continued)

(52) U.S. Cl.
CPC ............ *B04C 5/081* (2013.01); *A47L 9/1608* (2013.01); *A47L 9/1625* (2013.01); *A47L 9/1633* (2013.01); *A47L 9/1641* (2013.01); *A47L 9/1683* (2013.01); *B01D 45/12* (2013.01); *B01D 45/16* (2013.01); *B04C 5/02* (2013.01); *B04C 5/10* (2013.01); *B04C 5/185* (2013.01); *B04C 5/26* (2013.01)

(58) Field of Classification Search
CPC .. B04C 5/02; B04C 5/081; B04C 5/10; B04C 5/185; B04C 5/187; B04C 5/26; A47L 9/1608; A47L 9/1625; A47L 9/1633; A47L 9/1641; A47L 9/1683; B01D 45/12; B01D 45/16
See application file for complete search history.

(56) References Cited

U.S. PATENT DOCUMENTS 8,034,140 B2    10/2011  Conrad
8,561,257 B2    10/2013  Conrad
(Continued)

FOREIGN PATENT DOCUMENTS

GB    1 462 993         1/1977
GB    1462993      *    1/1977    ............. B01D 50/00
(Continued)

OTHER PUBLICATIONS

English language machine translation for JP 2004-147762. Retrieved from http://translationportal.epo.org on Jun. 28, 2018. (Year: 2018).*
(Continued)

*Primary Examiner* — Jason M Greene
(74) *Attorney, Agent, or Firm* — Morrison & Foerster LLP

(57) ABSTRACT

A cyclonic separation apparatus includes an outer wall, an inner wall and a cyclonic chamber defined between the outer wall and inner wall. A section of the surfaces of both the outer wall and the inner wall are flattened. The inner wall and the outer wall are also concentrically arranged. During use a fluid moving around the cyclonic chamber flows between a curved passage and a flattened passage of the cyclonic chamber.

12 Claims, 5 Drawing Sheets

(51) Int. Cl.
*B04C 5/10* (2006.01)
*B01D 45/12* (2006.01)
*B01D 45/16* (2006.01)
*B04C 5/081* (2006.01)
*B04C 5/185* (2006.01)
*B04C 5/26* (2006.01)

(56) References Cited

U.S. PATENT DOCUMENTS

| | | | |
|---|---|---|---|
| 8,640,301 | B1 | 2/2014 | Lee et al. |
| 8,739,359 | B2 | 6/2014 | Conrad |
| 2003/0150325 | A1* | 8/2003 | Hyppanen ............... B01D 45/12 95/271 |
| 2004/0074814 | A1* | 4/2004 | Baglione ................. B04C 5/081 209/133 |
| 2010/0216621 | A1* | 8/2010 | Lankinen ............... B04C 5/081 494/13 |
| 2012/0017553 | A1* | 1/2012 | Park ........................ B04C 5/081 55/419 |
| 2015/0026919 | A1* | 1/2015 | Maeda ................... B01D 45/16 15/353 |
| 2016/0214119 | A1* | 7/2016 | Lankinen ............... B01D 45/12 |
| 2016/0296867 | A1* | 10/2016 | Stark ....................... B01D 45/12 |
| 2017/0209843 | A1* | 7/2017 | Narin ...................... B01D 45/16 |
| 2018/0015485 | A1* | 1/2018 | Mercier .................. B04C 5/081 |

FOREIGN PATENT DOCUMENTS

| | | | |
|---|---|---|---|
| GB | 2 326 360 | 12/1998 | |
| GB | 2326360 A | * 12/1998 | ............. B04C 5/081 |
| JP | 2004-147762 | * 5/2004 | ............... A47L 9/16 |
| JP | 2004-229826 | 8/2004 | |
| JP | 2004-229827 | 8/2004 | |
| JP | 2004-290212 | 10/2004 | |
| JP | 2005-95664 | 4/2005 | |
| JP | 3659191 | 6/2005 | |
| JP | 3686053 | 8/2005 | |
| JP | 4107940 | 6/2008 | |
| JP | 2011-161003 | 8/2011 | |
| JP | 5824640 | 11/2015 | |
| KR | 10-2004-0062456 | 2/2006 | |
| KR | 10-2003-0095199 | 7/2006 | |
| WO | WO-2009/139556 | 11/2009 | |

OTHER PUBLICATIONS

Search Report dated Jul. 15, 2016, directed to GB Application No. 1601224.7; 1 page.

* cited by examiner

CYCLONIC SEPARATION APPARATUS

REFERENCE TO RELATED APPLICATIONS

This application claims the priority of United Kingdom Application No. 1601224.7, filed Jan. 22, 2016, the entire contents of which are incorporated herein by reference.

FIELD OF THE INVENTION

The present invention relates to a cyclonic separation apparatus for a vacuum cleaner.

BACKGROUND OF THE INVENTION

Cyclonic separation apparatus for vacuum cleaners typically have a cyclonic chamber, the cyclonic chamber having a generally cylindrical shape. The shape of the cyclonic chamber helps to create a cyclonic fluid flow path as a dirt laden fluid is drawn through it. Any dirt separated from the fluid can then be collected in a dirt collection chamber, which may also form part of the cyclonic separation apparatus. When considering the size of the cyclonic separation apparatus, a compromise may have to be made between having a large enough capacity in the dirt collection chamber whilst maintaining a high degree of separation efficiency in the cyclonic chamber. In addition, the overall size of the vacuum cleaner can be greatly affected by the size of the cyclonic separation apparatus. Therefore in order to achieve reasonably sized vacuum cleaner with an acceptable level of performance, a trade-off has to be made between the size of the cyclonic separation apparatus, and its separation efficiency and dirt capacity.

SUMMARY OF THE INVENTION

According to aspects of the present invention, a cyclonic separation apparatus comprises an outer wall; an inner wall; and a cyclonic chamber defined between the outer wall and inner wall, wherein the outer wall and the inner wall each comprise a curved section and a flat section, and the inner wall and the outer wall are concentrically arranged such that during use a fluid moving around the cyclonic chamber flows between a curved passage and a flat passage of the cyclonic chamber.

The flattening of a section of the outer wall of the cyclonic chamber reduces the size of the cyclonic separation apparatus, also allowing for a reduction in size of the vacuum cleaner to which it is attached. Additionally, the reduction in size achieved by flattening a section of the wall has less of an impact on the dirt capacity of the cyclonic separation apparatus. However, a flat section of an outer wall can produce a pinch point of reduced cross sectional area for fluid flowing around the cyclonic chamber. This pinch point can lead to a restricted or slowed fluid flow through the cyclonic chamber which can result in a lower separation efficiency. In addition, larger pieces of debris traveling within the cyclonic chamber can become trapped at the pinch point, thereby obstructing the cyclonic fluid flow path.

To reduce the impact of the flattened outer wall section, the counterpart of the inner wall of cyclone chamber has been flattened to create a cyclone chamber that, when viewed in a plan cross section, has a curved first passage following the general cylindrical shape of the cyclone chamber, and a flat or straight second passage. In other words, the plan cross section shape of both the inner and outer walls is, in geometric terms, generally circular with a segment removed, i.e. generally speaking a D-shaped cross section. Although the flattening of the inner and outer walls of the cyclone chamber reduces any pinch points between the inner and outer walls, it may produce a cyclone chamber with reduced separation efficiency. Therefore it is desirable to flatten only a single section of each of the outer and inner walls to create one single flat passage.

The cross sectional area of the cyclonic chamber may remain substantially constant through the curved passage and the flattened passage. As a result fluid flow pinch points can be prevented. In addition, a close to steady flow rate around the cyclone chamber can be achieved to help maintain a more even cyclonic fluid flow.

The cyclonic separation apparatus may comprise a fluid inlet, the fluid inlet being positioned on the flat section of the inner wall such that fluid admitted into the cyclonic chamber flows through the curved passage before flowing through the flat passage. Higher separation efficiency may be expected through the curved passage of the cyclone chamber. The fluid entering the cyclonic chamber therefore flows through the higher efficiency curved passage first to remove large particles of dirt and debris before the fluid flows through the flattened passage. This prevents any large parts of dirt and debris from being caught in any constricted or slower moving parts of the fluid flow path during the flow of the fluid from the curved passage to the flattened passage.

The inner wall may have multiple perforations that provide a fluid outlet from the cyclonic chamber. The inner wall forms a mesh shroud which can be used to filter particles of dirt or debris from a fluid stream exciting the cyclone chamber. The perforations may be provided on the curved section only of the inner wall. The separation efficiency of the flattened passage can be improved by not having perforations on the surface of the flattened section of the inner wall since the fluid is not drawn radially inwards through a perforated shroud as it passes through the flattened passage.

The cyclonic separation apparatus may comprise a dirt collection chamber located beneath the cyclonic chamber, the dirt collection chamber being bounded by the outer wall of the cyclonic chamber and a base that is pivotally connected to the outer wall, the base being released by an opening mechanism positioned along the flattened section of the outer wall. A flattened section on the outer wall allows for additional features, such as parts of an opening mechanism, to be included on the external surface of the cyclonic separation apparatus. A flattened wall, as opposed to a curved wall, provides a surface to which parts of an opening mechanism can be more easily attached. The flattened section can run along the span of the outer wall so that the opening mechanism can extend downwardly along the entire length of the cyclonic separation apparatus.

The outer profile of the opening mechanism may be curved such that the outer profile of the cyclonic separation apparatus around the outer wall and opening mechanism is cylindrical. This allows for a shape that can be easily recessed into the main body of a vacuum cleaner. Although the general cylindrical size of the cyclonic separation apparatus is made larger by curving the outer profile of the opening mechanism, the positioning of the bin opening mechanism on the bin surface reduces the overall bulk of the cyclonic separation apparatus, and the vacuum cleaner. In addition, the appearance of the apparatus is improved as the opening mechanism can be hidden or appear to be part of the cyclonic separation apparatus.

BRIEF DESCRIPTION OF THE DRAWINGS

In order that the present invention may be more readily understood, an embodiment of the invention will now be described, by way of example, with reference to the accompanying drawings, in which.

DETAILED DESCRIPTION OF THE INVENTION

Figure 1:
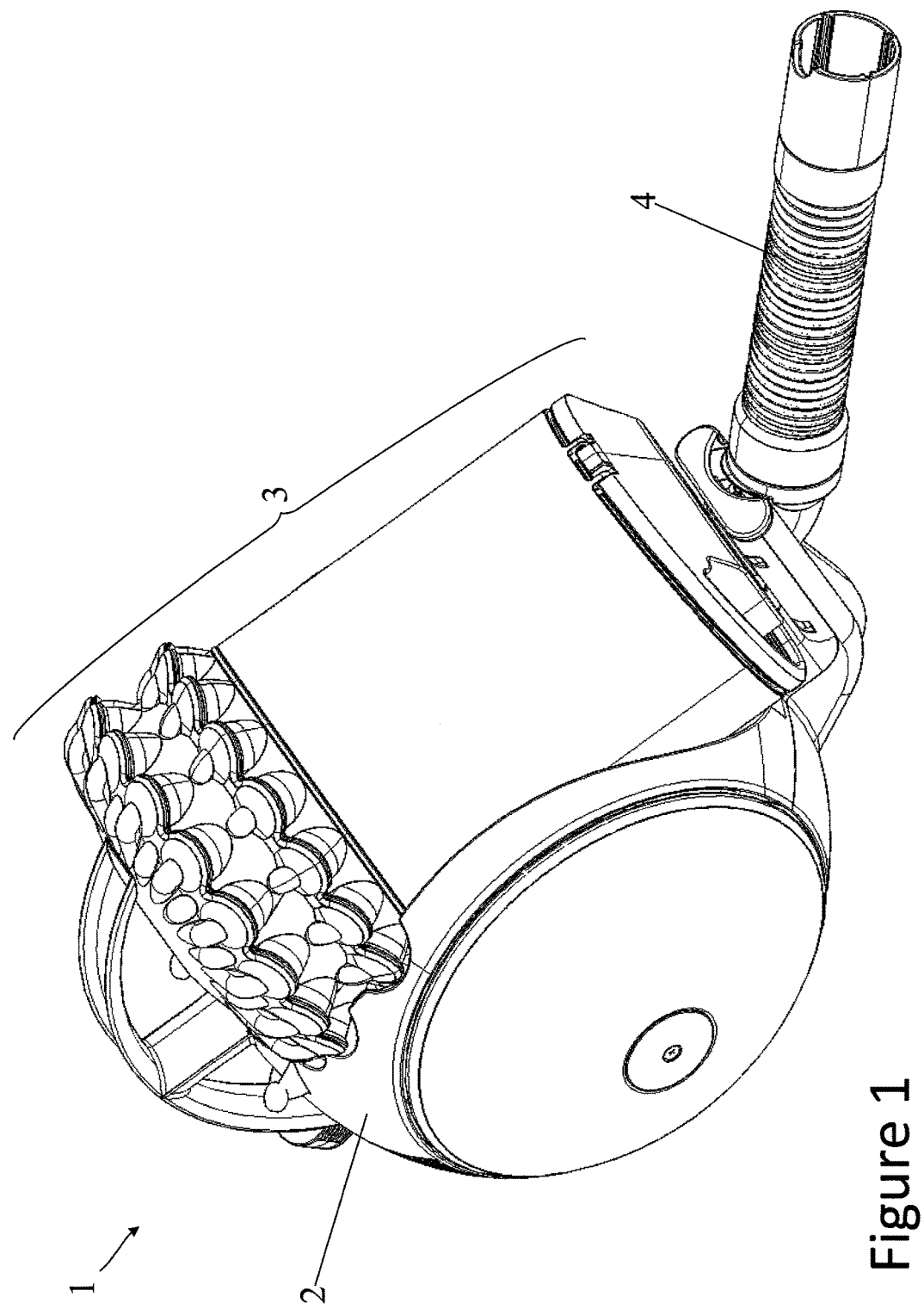
FIG. 1 is a perspective view of a cylinder vacuum cleaner with a cyclonic separation apparatus in accordance with the present invention.

The vacuum cleaner 1 of FIG. 1 is of the canister or cylinder type and has a main body 2, a cyclonic separation apparatus 3 and a hose assembly 4.

The main body 2 is shaped to accommodate the cyclonic separation apparatus 3. Specifically, the main body 2 is recessed such that the cyclonic separation apparatus 3 can be placed within it. The cyclonic separation apparatus 3 is detachable from the main body 2 such that the cyclonic separation apparatus 3 can be lifted away and any dirt collected in the cyclonic separation apparatus 3 can be emptied. In addition a hose assembly 4 is connected to the main body 2 to which a wand and/or a variety of cleaner heads can be attached (not shown). The main body 2 also comprises a suction source (not shown) which is positioned downstream of the cyclonic separation apparatus 3. When the cyclonic separation apparatus 3 is attached to the main body 2 and the suction source is powered, a fluid is drawn through the hose assembly 4 and subsequently through the cyclonic separation apparatus 3 to separate dirt from the fluid before it enters the main body 2.

Figure 2:
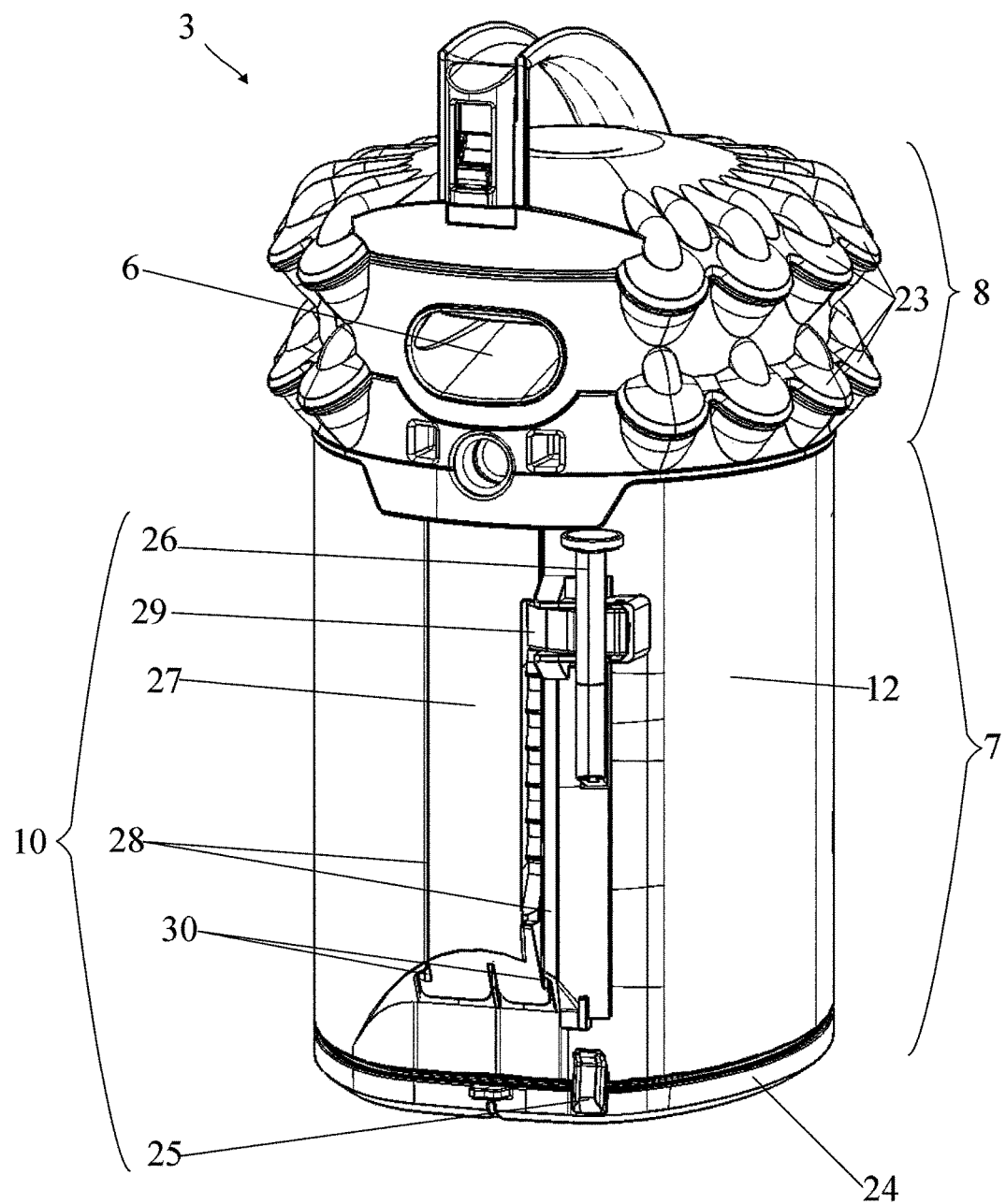
FIG. 2 is a rear view of the cyclonic separation apparatus showing the bin opening mechanism.
Figure 3:
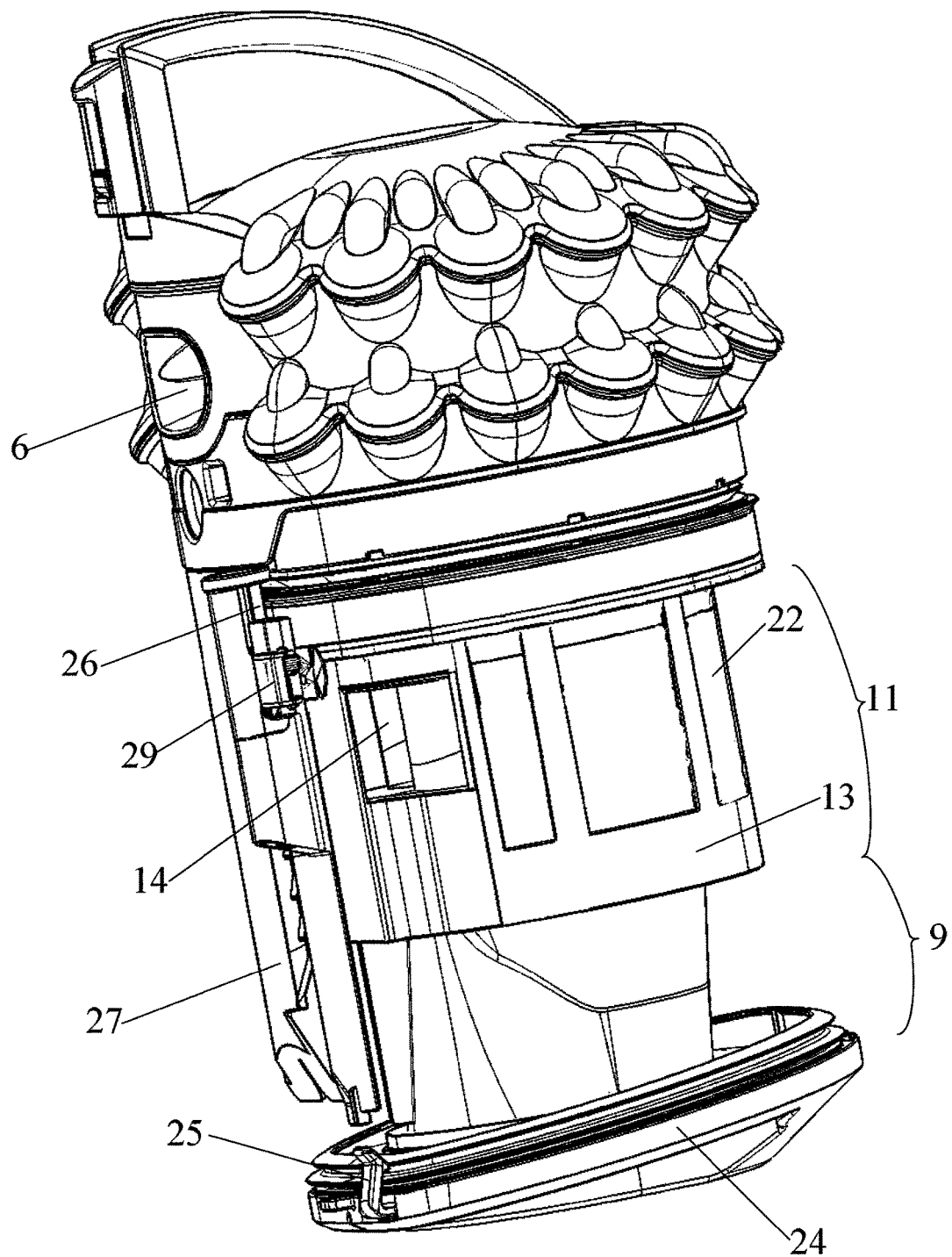
FIG. 3 is a side view of the cyclonic separation apparatus with the outer wall removed.
Figure 4:
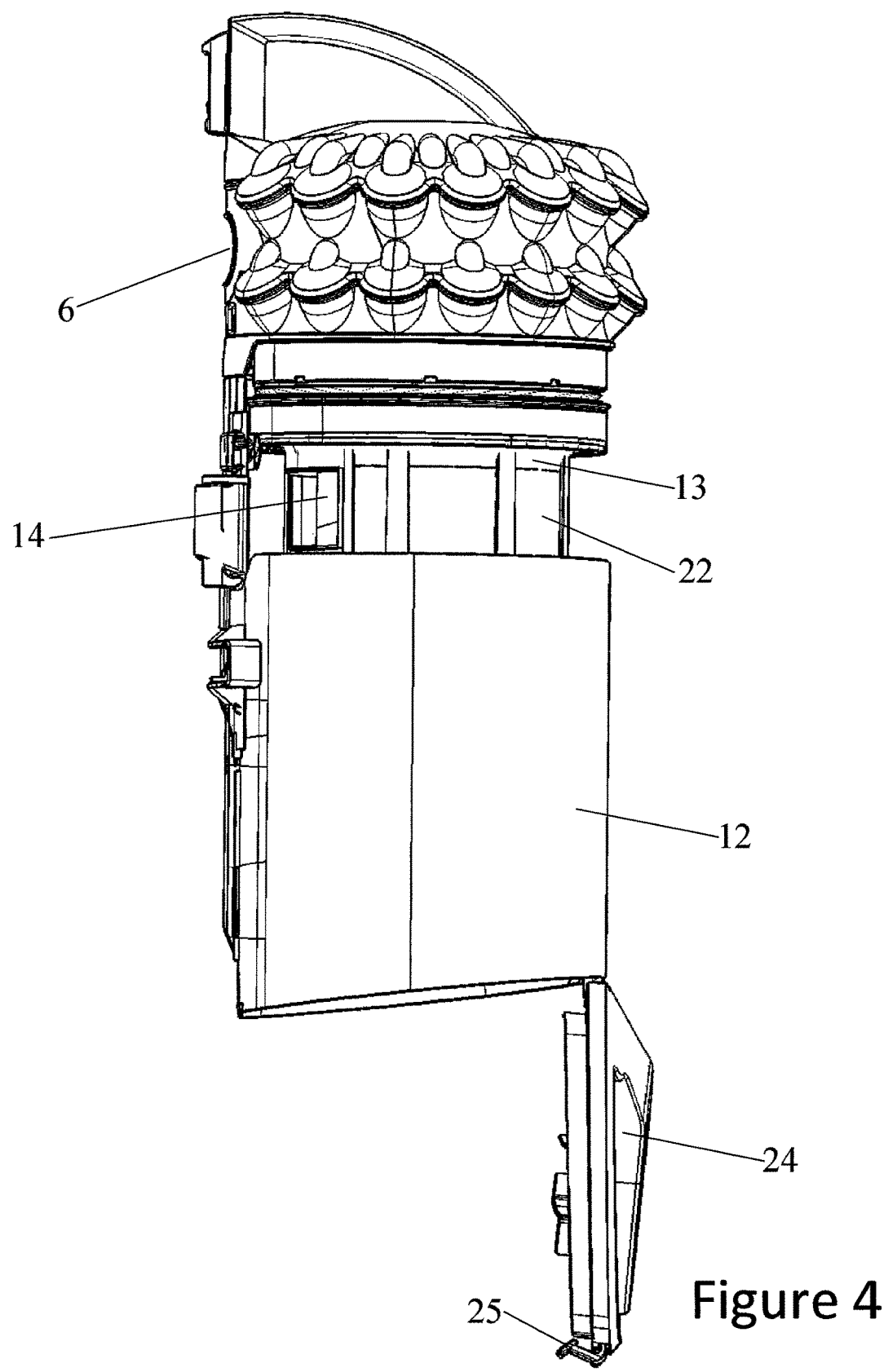
FIG. 4 is a side view of the cyclonic separation apparatus with the base in an open position.
Figure 5:
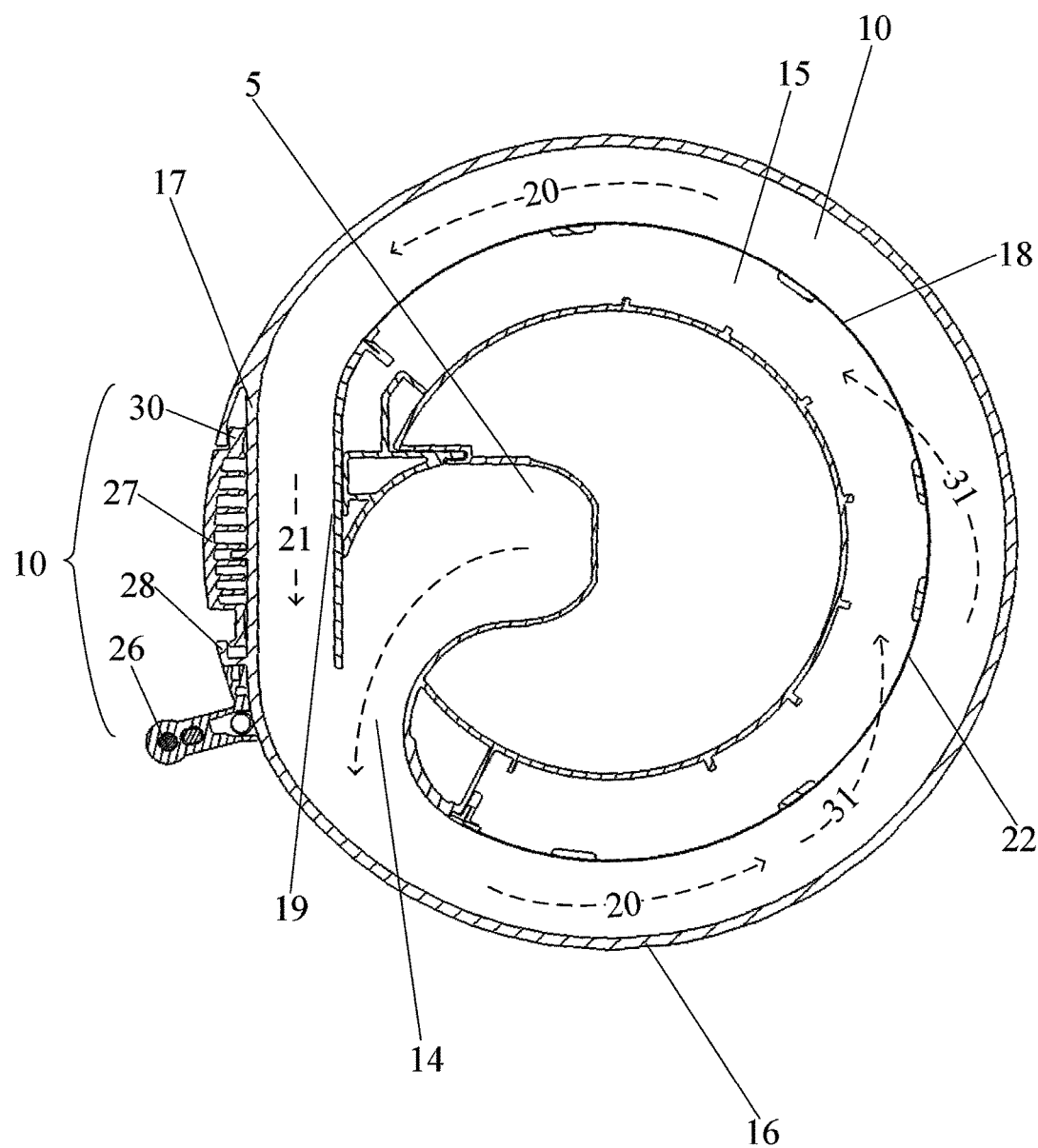
FIG. 5 is a sectional view of the cyclonic separation apparatus.

The cyclonic separation apparatus 3 is best shown in FIGS. 2 to 4 and comprises an inlet duct 5, a clean fluid outlet 6, a first cyclone stage 7, a second cyclone stage 8 located downstream of the first cyclone stage 7, a dirt collection chamber 9, and an opening mechanism 10. The inlet duct 5 is centrally positioned within the cyclonic separation apparatus 3 (as shown in FIG. 5). Dirt laden fluid is drawn in to the cyclonic separation apparatus 3 through the inlet duct 5. The fluid is then drawn through the first and second cyclone stages 7,8 and then exits the cyclonic separation apparatus 3 through the clean fluid outlet 6. Dirt and debris separated from the fluid as it is drawn through the cyclonic separation apparatus 3 accumulates in the dirt collection chamber 9, which is emptied using the opening mechanism 10.

The first cyclone stage 7 comprises a cyclonic chamber 11. The cyclonic chamber 11 is bounded by an outer wall 12 and an inner wall 13 and has a fluid inlet 14 and a fluid outlet 15. The outer wall 12 forms part of the casing of the cyclonic separation apparatus 3 and is generally cylindrical in shape. Specifically, the shape of the outer wall 12 has a curved section 16 and a flattened section 17, such that the cross-sectional shape of the outer wall 12 resembles a circle with a segment removed from it (best shown in FIG. 5). The outer wall 12 surrounds the inner wall 13. The inner wall 13 is similar in shape to the outer wall 12 and also has a curved section 18 and a flattened section 19. The inner wall 13 is concentrically arranged within the outer wall 12, such that a nominally annular space is created between them to define the cyclonic chamber 11. Due to the shape and arrangement of the outer wall 12 and inner wall 13, the annular space in the cyclonic chamber 11 is said to have a curved passage and a straight passage, shown in FIG. 5 by arrows 20 and 21, respectively. The fluid inlet 14 is connected to the inlet duct 5 and allows for a dirt laden fluid to enter the cyclonic chamber 11. The fluid inlet 14 is located at one end of the inlet duct 5 and forms part of the flattened section 19 of the inner wall 13 (best shown in FIGS. 5 and 3). The inner wall 13 is provided with fine perforations so as to form a permeable shroud or mesh 22 for fluid to pass through. The shroud or mesh 22 provides the cyclonic chamber 11 with a fluid outlet 15. The shroud or mesh 22 is perforated only along its curved section 18, such that the flattened section 19 of the shroud or mesh 22 is without perforations.

The second cyclone stage 8 comprises a plurality of cyclones 23 arranged in a series and/or a parallel configuration. Fluid is drawn from the fluid outlet 15 of the cyclonic chamber 10 and through the plurality of cyclones 23 of the second cyclone stage 8. Finer dirt and debris can be separated from the fluid by the plurality of cyclones 23, before the fluid is drawn through the clean fluid outlet 6.

The dirt collection chamber 9 is formed at the bottom of the cyclonic separation apparatus 3 and is therefore located beneath both the first and second cyclone stages 7,8. Dust and debris separated from the fluid as it travels through both the first and second cyclone stages 7,8 accumulates in the dirt collection chamber. The dirt collection chamber is bounded by the outer wall 12 and also a base 24. Although closed during normal operation to collect dust and debris, the base 24 is openable to release the dust by being pivotally connected to the outer wall 12 via a hinge or pivot joint and locks to an opposing part of the outer wall 12 via a catch 25.

The opening mechanism 10 is best shown in FIGS. 2 and 3 and comprises a push rod 26 which engages with the catch 25. In addition, the opening mechanism also comprises a guide 27, two recesses 28 and a stop clasp 29. The guide 27 is a rigid length of material that extends downwardly from a region of the second cyclone stage 8 below the clean fluid outlet 6. The external facing surface of the guide is curved so as to give the impression that the cyclonic separating apparatus 3 has a cylindrical shape. The guide 27 comprises two railings 30 that extend along the upright sides of the guide 27. The two recesses 28 form part of the external surface of the outer wall 12 or casing. The two recesses 28 accommodate the two railings 30 of the slider 27. The outer wall 12 or casing can slide up and down along the guide. Downward movement of the outer wall 12 or casing is limited by the stop clasp 29 which is positioned on the outer wall 12 or casing. The mechanism of bin opening will be described in more detail below.

During use of the vacuum cleaner 1, dirt laden fluid is drawn through the hose assembly 4 and into the cyclonic separation apparatus 3 via the inlet duct 5. The fluid is drawn through the cyclonic separation apparatus 3 and introduced into the first cyclone stage 7 via the fluid inlet 14 of the cyclonic chamber 11. The fluid travels in a cyclonic pathway following the limits of the outer wall 12 and the inner wall 13. The fluid inlet 14 is positioned at an end of the flattened section 19 of the inner wall 13, such that the fluid is drawn around the curved section 18 of the inner wall 13 (as shown by arrow 20 in FIG. 5). High initial separation efficiency is achieved by creating a fluid flow path that first travels around the curved section 18 of the inner wall 13 before reaching the flattened section 19 of the inner wall 13. The fluid flow path straightens as the fluid is drawn through the flattened passage (shown by arrow 21 in FIG. 5). The fluid is drawn through the shroud or mesh 22 of the inner wall 13 and exits the cyclonic chamber 11 of the first cyclone stage 7 (shown by arrow 31 in FIG. 5). Any separated dust or debris settles and accumulates in the dirt collection chamber 9 beneath the cyclonic chamber 11.

The fluid is then drawn through the plurality of cyclones 23 in the second cyclone stage 8. The plurality of cyclones 23 are of higher separation efficiency than the cyclonic chamber 11 of the first cyclone stage 7 and so finer dust and debris can be separated from the fluid. Again, separated dust or debris settles and accumulates in the dirt collection chamber 9 which is located beneath the plurality of cyclones 23. The fluid is then drawn through the clean fluid outlet 6 as it passes through the cyclonic separation apparatus 3. A filter (not shown) may be provided in the fluid flow path to further cleanse the fluid of dust or debris before or after it is drawn through the clean fluid outlet 6.

Once the capacity of the dirt collection chamber 11 is reached, the cyclonic separation apparatus 3 can be detached from the main body for emptying. The dirt collection chamber 11 of the cyclonic separation apparatus 3 can be emptied by the user pushing the push rod 26 downwardly and releasing the catch 25. The base 24 is then free to swing open (as shown in FIG. 4). Any collected dirt is then free to fall out of the opened base 24. The outer wall 12 or casing is also able to slide along the guide 27 to a point where the stop clasp 29 prevents the outer wall 12 or casing from being removed. The stop clasp 29 can be depressed by the user to free the outer wall 12 or casing and the base 24 from the cyclonic separation apparatus 3 if necessary.

The invention claimed is:

1. A cyclonic separation apparatus comprising:
   an outer wall;
   an inner wall; and
   a cyclonic chamber defined between the outer wall and inner wall,
   wherein the outer wall and the inner wall each comprise a curved section and a flat section, and the inner wall and the outer wall are concentrically arranged such that during use a fluid moving around the cyclonic chamber flows between a curved passage and a flat passage of the cyclonic chamber, and
   wherein the cyclonic separation apparatus comprises a fluid inlet, the fluid inlet being positioned on the flat section of the inner wall such that fluid admitted into the cyclonic chamber flows through the curved passage before flowing through the flat passage.

2. The cyclonic separation apparatus of claim 1, wherein the cross-sectional area of the cyclonic chamber remains constant through the curved passage and the flattened passage.

3. The cyclonic separation apparatus of claim 1, wherein the inner wall has multiple perforations that provide a fluid outlet from the cyclonic chamber.

4. The cyclonic separation apparatus of claim 3, wherein the perforations are provided on the curved section only of the inner wall.

5. The cyclonic separation apparatus of claim 1, wherein the cyclonic separation apparatus comprises a dirt collection chamber located beneath the cyclonic chamber, the dirt collection chamber being bounded by the outer wall of the cyclonic chamber and a base that is pivotally connected to the outer wall, the base being released by an opening mechanism positioned along the flattened section of the outer wall.

6. The cyclonic separation apparatus of claim 5, wherein the outer profile of the opening mechanism is curved such that the outer profile of the cyclonic separation apparatus around the outer wall and opening mechanism is cylindrical.

7. A vacuum cleaner comprising a cyclonic separation apparatus, wherein the cyclonic separation apparatus comprises:
   an outer wall;
   an inner wall; and
   a cyclonic chamber defined between the outer wall and inner wall,
   wherein the outer wall and the inner wall each comprise a curved section and a flat section, and the inner wall and the outer wall are concentrically arranged such that during use a fluid moving around the cyclonic chamber flows between a curved passage and a flat passage of the cyclonic chamber, and
   wherein the cyclonic separation apparatus comprises a fluid inlet, the fluid inlet being positioned on the flat section of the inner wall such that fluid admitted into the cyclonic chamber flows through the curved passage before flowing through the flat passage.

8. The vacuum cleaner of claim 7, wherein the cross-sectional area of the cyclonic chamber remains constant through the curved passage and the flattened passage.

9. The vacuum cleaner of claim 7, wherein the inner wall has multiple perforations that provide a fluid outlet from the cyclonic chamber.

10. The vacuum cleaner of claim 9, wherein the perforations are provided on the curved section only of the inner wall.

11. The vacuum cleaner of claim 7, wherein the cyclonic separation apparatus comprises a dirt collection chamber located beneath the cyclonic chamber, the dirt collection chamber being bounded by the outer wall of the cyclonic chamber and a base that is pivotally connected to the outer wall, the base being released by an opening mechanism positioned along the flattened section of the outer wall.

12. The vacuum cleaner of claim 11, wherein the outer profile of the opening mechanism is curved such that the outer profile of the cyclonic separation apparatus around the outer wall and opening mechanism is cylindrical.

* * * * *